(12) United States Patent
Nesdill et al.

(10) Patent No.: US 9,567,906 B2
(45) Date of Patent: Feb. 14, 2017

(54) SYSTEMS AND METHODS FOR CONTROLLING AIRCRAFT MAIN ENGINE SPEEDS BY ADJUSTING COMPRESSED AIR FLOW FROM AN APU

(71) Applicant: HONEYWELL INTERNATIONAL INC., Morristown, NJ (US)

(72) Inventors: Thomas Nesdill, Phoenix, AZ (US); Michael Dwyer, Phoenix, AZ (US); John Arenare, Sun Lakes, AZ (US); Cecilia Lam, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 462 days.

(21) Appl. No.: 14/105,844

(22) Filed: Dec. 13, 2013

(65) Prior Publication Data

US 2015/0167553 A1    Jun. 18, 2015

(51) Int. Cl.
*F02C 7/057* (2006.01)
*F02C 7/26* (2006.01)
*F02C 9/20* (2006.01)
*F02C 7/277* (2006.01)

(52) U.S. Cl.
CPC ............... *F02C 7/057* (2013.01); *F02C 7/26* (2013.01); *F02C 7/277* (2013.01); *F02C 9/20* (2013.01); *F05D 2220/50* (2013.01); *F05D 2260/85* (2013.01); *F05D 2270/304* (2013.01); *F05D 2270/306* (2013.01)

(58) Field of Classification Search
CPC ............. F02C 7/26; F02C 7/268; F02C 7/275; F02C 7/277; F02C 7/32; F02C 6/06; F05D 2220/50; F05D 2260/85; F05D 2270/304; F04D 27/02; F04D 27/002; F04D 27/0207
See application file for complete search history.

(56) References Cited

U.S. PATENT DOCUMENTS

| 4,370,560 | A | * | 1/1983 | Faulkner | .............. F02C 9/58 |
| | | | | | 290/40 C |
| 4,627,234 | A | * | 12/1986 | Schuh | ............... F02C 3/085 |
| | | | | | 60/39.281 |
| 4,916,893 | A | | 4/1990 | Rodgers | |
| 5,123,239 | A | | 6/1992 | Rodgers | |
| 5,127,220 | A | | 7/1992 | Jesrai et al. | |
| 5,245,820 | A | * | 9/1993 | Zalewski | ............. F01D 25/18 |
| | | | | | 60/39.08 |

(Continued)

OTHER PUBLICATIONS

EP Extended Search Report for Application No. 14193544.5 Dated May 8, 2015.

*Primary Examiner* — Gerald L Sung
*Assistant Examiner* — Alain Chau
(74) *Attorney, Agent, or Firm* — Lorenz & Kopf, LLP

(57) ABSTRACT

An aircraft engine system includes a main engine having a main engine speed; a starter coupled to the main engine and configured to drive the main engine with compressed air; and an auxiliary power unit (APU) system coupled to the starter and configured to provide the compressed air to the starter. The APU system includes an APU with a compressor to generate the compressed air, and an APU electronic control unit (ECU) coupled to the APU, the APU ECU configured to receive the engine speed of the main engine and to control operation of the APU to modify an amount of the compressed air to the starter based on the main engine speed.

11 Claims, 4 Drawing Sheets

(56) References Cited

U.S. PATENT DOCUMENTS

| | | | |
|---|---|---|---|
| 6,272,838 B1 | 8/2001 | Harvell et al. | |
| 7,712,299 B2 * | 5/2010 | Wolflick | F04D 25/04 60/39.091 |
| 8,403,257 B2 | 3/2013 | Hissong | |
| 2009/0314002 A1 * | 12/2009 | Libera | F02C 6/08 60/778 |
| 2012/0006935 A1 | 1/2012 | Bhargava | |
| 2012/0168557 A1 | 7/2012 | Edelson et al. | |
| 2012/0266606 A1 * | 10/2012 | Zeiner | F02C 7/277 60/788 |
| 2013/0019606 A1 * | 1/2013 | McLeister | F02C 9/54 60/773 |
| 2013/0204506 A1 * | 8/2013 | Ertz | F02C 7/26 701/100 |
| 2013/0227959 A1 | 9/2013 | Ainslie et al. | |

\* cited by examiner

SYSTEMS AND METHODS FOR CONTROLLING AIRCRAFT MAIN ENGINE SPEEDS BY ADJUSTING COMPRESSED AIR FLOW FROM AN APU

TECHNICAL FIELD

The present invention generally relates to gas turbine engines, and more specifically to systems and methods for controlling aircraft main engines during start operations, including main engine cold motoring operations.

BACKGROUND

Many relatively large turbine engines, including aircraft main engines, may use an air turbine starter to initiate turbine engine rotation. The air turbine starter may be coupled to a high pressure fluid source, such as compressed air, which impinges upon a turbine in the air turbine starter causing it to rotate at a relatively high rate of speed. The air turbine starter includes an output shaft that is coupled to the turbine and, perhaps via one or more gears, to the main engine gearbox such that the main engine is rotated with the air turbine starter. When the main engine reaches a predetermined speed, the main engine is ignited such that a self-sustaining speed is achieved and operation is enabled without further assistance. More recently developed main engines have tighter starting tolerances, thereby requiring a more precise control of the start operation. As an example, the main engine may require a cold motoring operation in which the main engine is rotated for a predetermined amount of time prior to ignition.

Typically, the pneumatic power provided to start the main engine via the air turbine starter is provided by an auxiliary power unit (APU). Generally, such APUs may include one or more compressors, combustors, and turbines to generate mechanical and electrical power, particularly when the aircraft is on the ground. Additionally, air from one of the APU compressors may be used to drive the main engine via the air turbine starter. Although conventional APUs have been used to provide satisfactory assistance during start operations of aircraft main engines, more efficient uses of the APUs are desired, particularly with respect to controlling the speed of the main engine during start operations.

Accordingly, it is desirable to provide improved systems and methods for controlling aircraft main engines and the APU while the APU is providing the pneumatic energy for starting the aircraft main engines. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an aircraft engine system includes a main engine having a main engine speed; a starter coupled to the main engine and configured to drive the main engine with compressed air; and an auxiliary power unit (APU) system coupled to the starter and configured to provide the compressed air to the starter. The APU system includes an APU with a compressor to generate the compressed air, and an APU electronic control unit (ECU) coupled to the APU, the APU ECU configured to receive the engine speed of the main engine and to control operation of the APU to modify an amount of the compressed air to the starter based on the main engine speed.

In accordance with an exemplary embodiment, a method is provided of operating an aircraft engine system. The method includes receiving, at an auxiliary power unit (APU) electronic control unit (ECU), a main engine cold motoring command; receiving, at the APU ECU, a main engine speed of a main engine; and controlling operation of an auxiliary power unit (APU) based on the main engine speed and the engine cold motoring command until a predetermined main engine speed of the main engine is achieved.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein relate to improved systems and methods for simultaneously controlling the speed of an aircraft main engine while optimizing APU operational stability, performance, and reliability, particularly during a start operation. In one exemplary embodiment, an air turbine starter may be used to drive the main engine during a start operation, which may include a cold motoring operation. The air turbine starter may use compressed air from an auxiliary power unit (APU) system. The APU system may be controlled to provide a designated amount of air to the air turbine starter to thus control the speed of the main engine. The APU system may adjust, as examples, inlet guide vanes and a surge control valve to provide the desired amount of compressed air based on the main engine speed.

Figure 1:
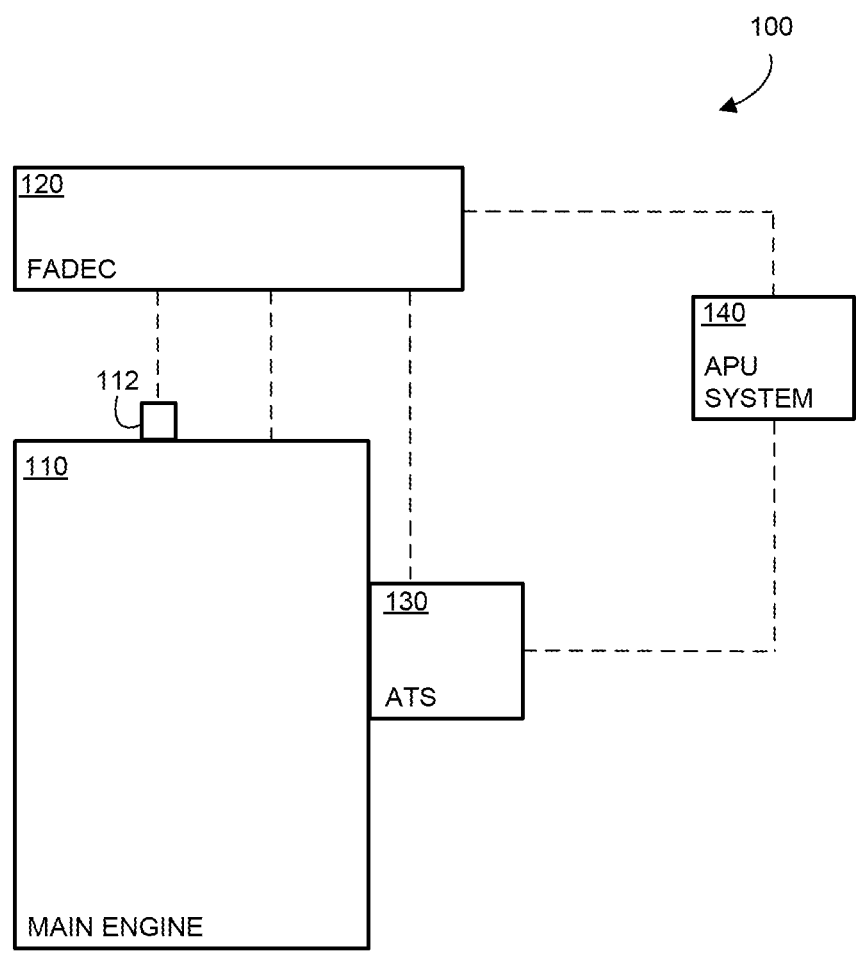
FIG. 1 is a schematic block diagram of an aircraft engine system in accordance with an exemplary embodiment.

FIG. 1 is a schematic block diagram of an aircraft engine system 100 in accordance with an exemplary embodiment. As shown, the engine system 100 includes a main engine 110, a main engine full authority digital engine controller (FADEC) 120, an air turbine starter 130, and an APU system 140. In one exemplary embodiment, the engine system 100 is an aircraft system, although other applications may be provided. A brief description of the components of the engine system 100 will be provided below prior to a more detailed description of a main engine start operation.

Generally, the main engine 110 is configured to generate mechanical power for propulsion of the aircraft and, in many instances, may also be used to drive various rotating components such as, for example, generators, compressors, and pumps, to thereby supply electrical, pneumatic, and/or hydraulic power. In one exemplary embodiment, the main engine 110 is a gas turbine engine. As such and although not shown, the main engine 110 typically includes a compressor system, a combustion system, a turbine system, and an exhaust system that function to generate power during flight, as generally recognized.

However, when an aircraft is on the ground, its main engine 110 may not be operating and/or capable of supplying power. In these instances, the APU system 140 may be utilized to supply power to various aircraft system, including to restart the main engine 110 during a start operation, as discussed below.

In addition to the power components, the main engine 110 may include a number of sensors and actuators implemented at various locations to detect and adjust engine performance parameters, such as turbine rotational velocities, engine pressures, engine temperatures, and/or other controlled parameters, such as fuel flow and inlet guide vane positions. In the depicted embodiment, the main engine 110 includes at least one speed sensor 112 that functions to determine the speed of the main engine 110.

The FADEC 120 is generally configured to control operation of the engine system 100, including the main engine 110. The FADEC 120 may control any engine parameter, although as discussed below, the FADEC 120 may provide various commands to the main engine 110, the air turbine starter 130, and the APU system 140 to control operation, particularly during a start operation. The commands generated by the FADEC 120 may be based on feedback from the main engine 110, including the engine speed provided by sensor 112, as well as operator commands, including the start operation commands discussed below.

Such commands from the FADEC 120 may be provided to one or more of the actuators to thereby control engine operation. For example, the actuators may be used to control the position or speed of one or more components to thereby manage engine parameters affecting engine operation. In other examples, the actuators may be used to open and/or shut valves to control fuel flow or to position one or more guide vanes to influence air flow through the engine.

As noted above, the engine system 100 further includes an air turbine starter 130 to initiate engine rotation of the main engine 110 via the main engine gearbox, such as during a start operation. As such, the air turbine starter 130 is coupled to a high pressure fluid source, such as compressed air, which impinges upon a turbine in the air turbine starter 130, thereby causing it to rotate at a relatively high rate of speed. The air turbine starter 130 includes an output shaft that is coupled to the turbine and, via one or more gears, to the main engine 110. The output shaft of the air turbine starter 130, rotated by the turbine, thus causes the main engine 110 to begin rotating. Typically, and as described below, the air turbine starter 130 is configured to drive the main engine 110 until a self-sustaining speed in which the main engine can operate without the air turbine starter 130.

Generally, the APU system 140 is configured to supplement main propulsion engines by providing electrical and/or pneumatic power. As described in greater detail below, the APU system 140 provides the pneumatic power to the air turbine starter 130 to assist the start operation of the main engine 110 based on commands from the FADEC 120.

Generally, assistance to the main engine 110 is provided during a start operation. In one exemplary embodiment, the start operation includes a main engine cold motoring operation in which the engine is cooled. Typically, the main engine cold motoring operation involves rotating the main engine without ignition. Upon sufficient cooling during the main engine cold motoring operation, the start operation further includes an ignition operation. In the ignition operation, the combustion process in the main engine 110 is ignited and assisted until the main engine 110 reaches a self-sustaining speed in which operation may be continued without additional assistance. At this point, assistance from the APU system 140 and air turbine starter 130 may be withdrawn. The FADEC 120 generates a main engine cold monitoring command and ignition command to carry out the start operation. Additional details about the APU system 140 will be provided below with reference to FIG. 2.

Figure 2:
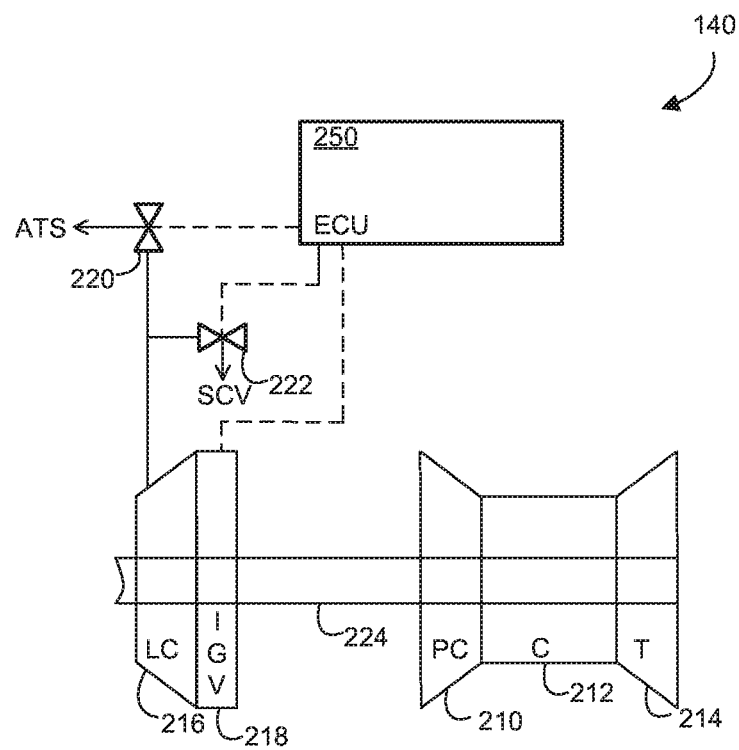
FIG. 2 is a schematic block diagram of an auxiliary power unit (APU) system of the aircraft engine system of FIG. 1 in accordance with an exemplary embodiment.

FIG. 2 is a schematic block diagram of an auxiliary power unit (APU) system in accordance with an exemplary embodiment. The APU system depicted in FIG. 2 may correspond the APU system 140 of the aircraft engine system 100 of FIG. 1, and as such, FIG. 2 will be discussed below with reference to FIG. 1.

Generally, the APU system 140 includes an APU 200 and an APU ECU 250. The APU ECU 250 is configured to control operation of the APU 200 based on instructions stored in memory and executed by a processor, as well as based on commands and feedback from the operator and/or other aircraft systems such as the FADEC 120. In one exemplary embodiment, the APU ECU 250 includes logic to adjust the pneumatic output of the APU 200 provided to the air turbine starter 130 to thus control the speed of the main engine 110. Additional details about this operation will be described below after a brief description of the APU 200.

The APU 200 includes a power compressor 210, a combustor 212, a power turbine 214, and a load compressor 216. During operation, the power compressor 210 draws ambient air into an inlet, compresses the air, and supplies the compressed air to the combustor 212. It will be appreciated that the power compressor 210 may be implemented using any one of numerous types of compressors. For example, the power compressor 210 may be a single-stage or multi-stage centrifugal and/or axial compressor system. The combustor 212 receives the compressed air from the power compressor 210, and also receives a flow of fuel from a non-illustrated fuel source. The fuel and compressed air are mixed within the combustor 212, and are ignited to produce relatively high-energy combustion gas. The combustor 212 may be implemented as any one of numerous types of combustors, including can-type combustors, reverse-flow combustors, through-flow combustors, and slinger combustors.

The relatively high-energy combustion gas that is generated in the combustor 212 is supplied to the turbine 214. As the high-energy combustion gas expands through the turbine 214, it impinges on the turbine blades, which causes the turbine 214 to rotate. It will be appreciated that the turbine 214 may be implemented using any one of numerous types of turbines. The turbine 214 includes an output shaft 224 that drives the power compressor 210 and the load compressor 216.

When driven, the load compressor 216 draws ambient air into an inlet, via a plurality of inlet guide vanes 218, and compresses the air. The compressed air may be supplied to various pneumatic loads via a bleed air valve 220. As noted above, one such pneumatic load includes air provided to the air turbine starter 130 for the main engine 110. The load compressor 216 may be implemented using any one of numerous types of compressors, including a single-stage or multi-stage centrifugal and/or axial compressor system.

As noted above, ambient air is drawn into the load compressor 216 via a plurality of inlet guide vanes 218. The inlet guide vanes 218 are disposed adjacent the inlet of the load compressor 216 and are movable, via one or more inlet guide vane actuators, to a plurality of positions. As such, air flow into and through the load compressor 216, and thus the amount of air to the pneumatic loads such as the air turbine starter 130, may be regulated by adjusting the position of the inlet guide vanes 218. Actuation of the positions of the inlet guide vanes 218 are controlled via control logic that, at least in the depicted embodiment, is disposed within the APU ECU 250.

A portion of the air from the load compressor 216 may be removed via a surge control valve 222. As such, the surge control valve 222 may be opened to decrease the amount of air to the pneumatic loads and closed to otherwise increase the amount of air the pneumatic loads. As an example, the surge control valve 222 may be provided to limit the pressure downstream of the compressor, as necessary or desired. Air from the surge control valve 222 may be dumped overboard. Actuation of the positions of the surge control valve 222 is controlled via control logic that, at least in the depicted embodiment, is disposed within the APU ECU 250.

As described in greater detail, the APU ECU 250 is configured to control the actuation of the inlet guide vanes 218 and the surge control valve 222 to provide a predetermined amount of air to the air turbine starter 130, from which a predetermined main engine speed may be implemented.

Figure 3:
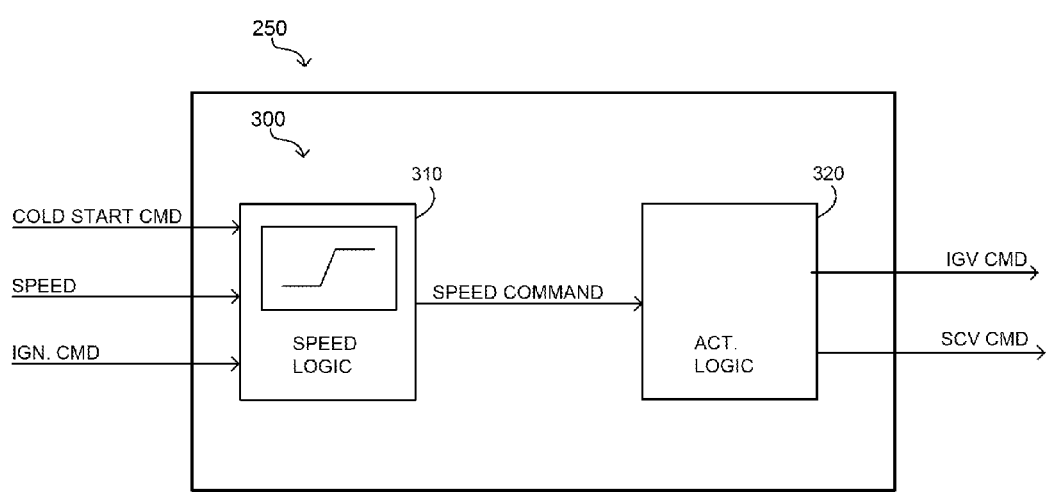
FIG. 3 is a block diagram of logic of an electronic control unit (ECU) of the APU system of FIG. 2 in accordance with an exemplary embodiment.

FIG. 3 is a block diagram of APU controller logic 300, such as the logic implemented in the APU ECU 250 of FIG. 2. In general, the logic 300 is represented as a simplified schematic to carry out the functions discussed below. In practice, the logic 300 may be implemented with any suitable logic components or combinations of logic components. The logic 300 may form various types of look-up tables and schedules.

In one exemplary embodiment, the logic 300 includes speed logic 310 that, based on a main engine cold motoring command, a main engine speed signal, and a main engine ignition command, generates a speed command. The speed logic 310 may include a speed schedule that corresponds to a main engine cold motoring schedule and/or a start schedule. The logic 300 further includes IGV actuator logic 320 that, based on the speed command from the speed logic 310, generates IGV actuator commands. In one exemplary embodiment, the actuator commands are inlet guide vanes commands and surge control valve commands to adjust the inlet guide vanes 218 and surge control valve 222 of the APU 200, respectively. Additionally information about the logic 300 will be discussed below with reference to FIG. 4.

Figure 4:
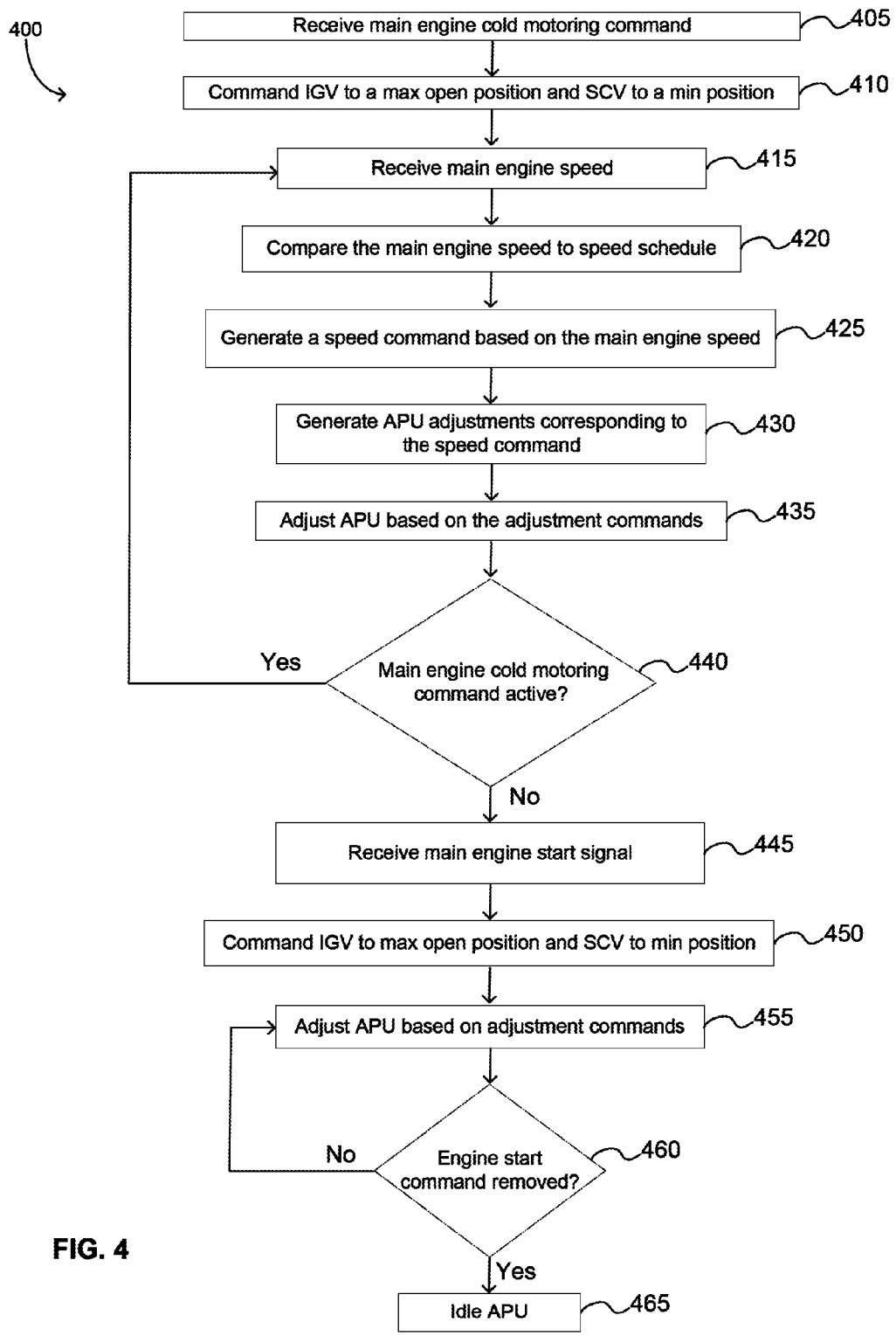
FIG. 4 is a flow chart of a method for operating an aircraft engine system in accordance with an exemplary embodiment.

FIG. 4 is a flow chart of a method 400 for operating an aircraft engine system, such as the aircraft engine system 100 discussed above. As such, operation of the engine system 100, particularly operation of the engine system 100 during a start operation, will now be described with reference to FIGS. 1-4. In one exemplary embodiment, in a first step 405, the main engine cold motoring command is provided by the FADEC 120 to the APU system 140, particularly at the APU ECU 250. The main engine cold motoring command may be initiated by an operator. In some embodiments, the main engine cold motoring command may be provided directly to the APU ECU 250.

In a step 410, the APU ECU 250 commands the inlet guide vanes 218 to a maximum open position and the surge control valve 222 to a minimum (or closed) position. As noted above, these commands may be implemented by the logic 300 of the APU ECU 250. As also noted above, this positioning of the inlet guide vanes 218 and surge control valve 222 results in the APU 200 providing pneumatic power to the air turbine starter 130, which in turn, drives the main engine 110.

In a step 415, the APU ECU 250 receives an indication of the speed of the main engine 110, which may, for example, be provided by the sensor 112 via the FADEC 120. In one exemplary embodiment, such parameters may be provided to the APU ECU 250 with a protocol such as ARINC 429.

In a step 420, the APU ECU 250 compares the main engine speed to a speed schedule. As an example, the APU ECU 250 evaluates the main engine speed with respect to a speed schedule in the speed logic 310, as described above.

In a step 425, the APU ECU 250 generates a speed command based on the main engine speed. For example, if the speed schedule of the speed logic 310 dictates that the main engine speed should be increased, the generated speed command represents an intended increase in main engine speed.

In a step 430, the APU ECU 250 generates APU adjustments corresponding to the speed command. In one exemplary embodiment, the APU adjustments are implemented as the actuator logic 320 discussed above. As such, the actuator logic 320 receives the speed command and generates inlet guide vanes commands and surge control valve commands, which represent the corresponding adjustments to the APU 200 that result in the intended increase (or decrease) in the main engine speed.

In a step 435, the APU 200 is adjusted based on the adjustment commands, including, as examples, adjustments to the surge control valve 222, the inlet guide vanes 218 or changing the governed speed setting of the APU. Such adjustments may include opening or closing the surge control valve 222 and the inlet guide vanes 218 to increase o decrease the pneumatic power to the air turbine starter 130, thereby increasing or decreasing the speed of the main engine 110.

In a step 440, the APU ECU 250 evaluates whether or not the main engine cold motoring command is still active. This may be determined in a number of ways. In one exemplary embodiment, the active indication may be a predetermined amount of time from the initial command. In other embodiments, the active indication may be based on an affirmative cancellation of the main engine cold motoring command or removal of the command from the FADEC 120.

If the main engine cold motoring command is still active in step 440, the APU ECU 250 continues to receive main engine speed, compare the main engine speed to a speed schedule, and generate speed commands and adjustment commands, as represented above in steps 415, 420, 425, and 430.

Upon removal of the main engine cold motoring command, in step 445, the APU ECU 250 receives a main engine ignition (or start) command, typically from the FADEC 120. In response, in step 450, the APU ECU 250 commands the inlet guide vanes 218 to the maximum open position and the surge control valve 222 to the minimum position, and in step 455, the APU 200 implements these adjustments based on the commands from the APU ECU 250. Steps 445 and 450 may be implemented in the speed logic 310 and actuator logic 320 or separate logic in the APU ECU 250.

In step 460, the APU ECU 250 evaluates if the engine ignition command from the FADEC 120 has been removed. If the engine ignition command has not been removed, the APU ECU 250 continues to command the APU 200 as represented by steps 450 and 455. If the engine ignition command has been removed, in step 465, the APU ECU 250 places the APU system 140 in an idle mode until a subsequent operator command and the process 400 is complete.

Accordingly, exemplary embodiments discussed herein provide improved systems and methods for controlling the speed of an aircraft main engine, particularly during a start operation. By adjusting the pneumatic output of the APU system via the inlet guide vanes and/or the surge control valve, a more precise amount of air may be provided to the air turbine starter, thereby providing more precise control of the main engine speed and more efficient use of the APU.

The engine systems and methods described above, particularly the FADEC and APU ECU, may be implemented in wide variety of platforms, such as a computer system that includes a processor, an interface, a storage device, a bus, and a memory that stores the start logic as a program. The processor performs the computation and control functions and may include any type of processor, including integrated circuits such as a microprocessor implemented on separate systems or as part of an overall aircraft control, navigation, avionics, communication or diagnostic system. During operation, the processor executes the programs contained within memory, which may be any type of suitable memory. The bus serves to transmit programs, data, status and other information or signals between the various components of engine system and may include any suitable physical or logical mechanisms of connecting computer systems and components.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft engine system, comprising:
    a main engine having a main engine speed;
    a starter coupled to the main engine and configured to drive the main engine; and
    an auxiliary power unit (APU) system coupled to the starter and configured to provide the compressed air to the starter, the APU system comprising
        an APU with a compressor to generate the compressed air,
        an APU electronic control unit (ECU) coupled to the APU, the APU ECU configured to receive the engine speed of the main engine and to control operation of the APU to modify an amount of the compressed air to the starter based on the main engine speed,
    wherein the compressor of the APU includes inlet guide vanes, and wherein the APU ECU is configured to adjust a position of the inlet guide vanes based on the main engine speed,
    wherein the APU further includes a surge control valve, and wherein the APU ECU is configured to adjust a position of the surge control valve based on the main engine speed,
    wherein the APU ECU controls operation of the APU based on a main engine cold motoring command to produce the amount of the compressed air to the starter such that a predetermined engine speed is achieved, and
    wherein, upon withdrawal of the main engine cold motoring command and receipt of an ignition command, the APU ECU is configured to adjust the position of the inlet guide vanes to a maximum position and the position of the surge control valve to a minimum position.

2. The aircraft engine system of claim 1, further comprising a full authority digital engine controller (FADEC) coupled to the main engine and the APU ECU, wherein the FADEC is configured to determine the main engine speed and provide the main engine speed to the APU ECU.

3. The aircraft engine system of claim 2, wherein the FADEC is configured to generate the main engine cold motoring command and to provide the main engine cold motoring command to the APU ECU.

4. The engine system of claim 3, wherein the APU ECU is configured to control operation of the APU to maintain the predetermined engine speed until the main engine cold motoring command is withdrawn.

5. The engine system of claim 4, wherein the FADEC is configured to generate the ignition command and to provide the ignition command to the APU ECU.

6. A method of operating an aircraft engine system, comprising the following steps:
    receiving, at an auxiliary power unit (APU) electronic control unit (ECU), a main engine cold motoring command;
    receiving, at the APU ECU, a main engine speed of a main engine;
    controlling operation of an auxiliary power unit (APU) based on the main engine speed and the engine cold motoring command until a predetermined main engine speed of the main engine is achieved;
    wherein the controlling including adjusting inlet guide vanes of the APU based on the main engine speed and the engine cold motoring command and adjusting a surge control valve of the APU based on the main engine speed and the engine cold motoring command;
    providing, prior to achieving the predetermined main engine speed of the main engine, compressed air from a compressor of the APU to a starter that drives the main engine;
    receiving, at the APU ECU, an ignition command, and
    controlling, upon receipt of the ignition command, operation of the APU by adjusting the inlet guide vanes to a maximum position and the surge control valve to a minimum position until the ignition command is withdrawn.

7. The method of claim 6, wherein the receiving step includes receiving the main engine speed from a full authority digital engine controller (FADEC).

8. The method of claim 7, wherein the controlling step includes controlling operation of the APU at the predetermined main engine speed until the main engine cold motoring command is withdrawn.

9. The method of claim 7, further comprising the step of idling, upon withdrawal of the ignition command, operation of the APU.

10. An auxiliary power unit (APU) system to assist a main engine during a start operation, the APU system comprising:
- an APU compressor with inlet guide vanes, the APU compressor configured to receive ambient air through the inlet guide vanes and to compress the ambient air to generate compressed air; and
- an APU electronic control unit (ECU) coupled to the inlet guide vanes and configured to adjust a position of the inlet guide vanes based on a main engine speed of the main engine; and
- a surge control valve configured to remove bleed air from the compressed air, wherein the APU ECU is further configured to adjust a position of the surge control valve based on the main engine speed of the main engine, wherein the APU ECU is further configured to adjust the position of the inlet guide vanes and the position of the surge control valve based on a main engine cold motoring command during the start operation, and wherein the APU ECU is further configured to continue adjusting the position of the inlet guide vanes and the position of the surge control valve to achieve a predetermined main engine speed during the start operation.

11. The APU system of claim 10, wherein the APU ECU is further configured to adjust the position of the inlet guide vanes and the position of the surge control valve based on an ignition command during the start operation.

* * * * *

UNITED STATES PATENT AND TRADEMARK OFFICE
CERTIFICATE OF CORRECTION

PATENT NO. : 9,567,906 B2  Page 1 of 1
APPLICATION NO. : 14/105844
DATED : February 14, 2017
INVENTOR(S) : Nesdill et al.

It is certified that error appears in the above-identified patent and that said Letters Patent is hereby corrected as shown below:

In the Claims

Column 7, Line 59, "the" should be deleted;
Column 7, Line 67, "." should be changed to -- , --.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*